Nov. 24, 1931.   H. GRATHWOHL   1,833,571
MACHINE FOR PICKING POULTRY
Filed Dec. 26, 1929   2 Sheets-Sheet 1

Inventor:
H. Grathwohl

Nov. 24, 1931.  H. GRATHWOHL  1,833,571
MACHINE FOR PICKING POULTRY
Filed Dec. 26, 1929  2 Sheets-Sheet 2

Inventor:
H. Grathwohl
By: Marks & Clerk
Attys.

Patented Nov. 24, 1931

1,833,571

UNITED STATES PATENT OFFICE

HERMANN GRATHWOHL, OF TENINGEN, GERMANY

MACHINE FOR PICKING POULTRY

Application filed December 26, 1929, Serial No. 416,634, and in Germany December 20, 1928.

The present invention relates to improvements in machines for picking feathers from the bodies of poultry.

The invention has for its object to provide a simple and efficient machine for picking feathers from fowl in which the picking device is carried by a comb-like base plate and is given a compound movement, one movement effecting the gripping and release of the feathers and the second movement taking place in the plane perpendicular to the base plate and causing the removal of the feathers.

In the accompanying drawings wherein an approved embodiment of the invention is illustrated:

Figure 3:
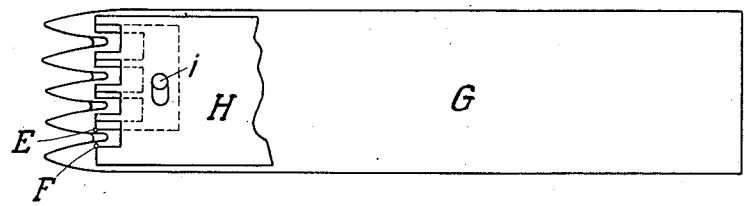

Figure 3 diagrammatically shows the base-plate and the picking-elements in top plan.

Figure 4:
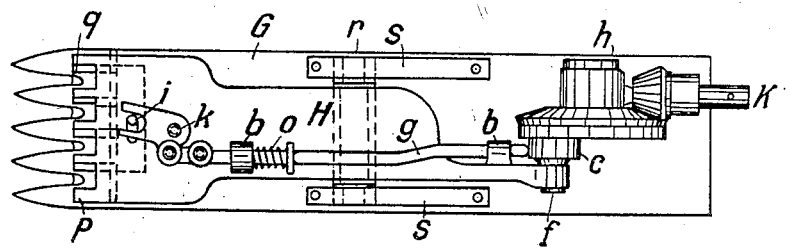

Figure 4 shows the operating-device for the picker in top plan, and

Figure 5:
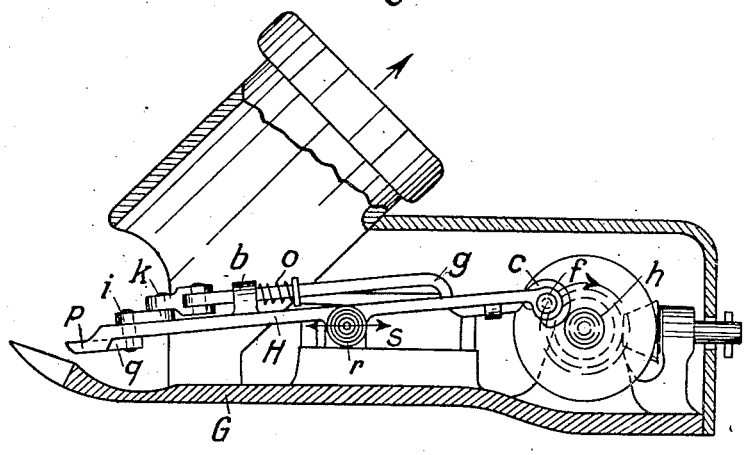

Figure 5 is a side-view of the operating elements of the picker.

Figure 1:
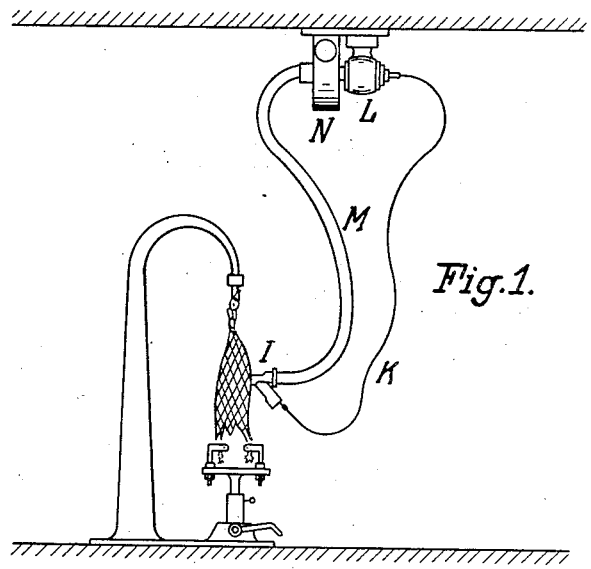
Fig. 1 is a side elevation of the picking machine applied to use.

The fowl to be picked is, as shown in Fig. 1, grasped by its neck and his two legs and stretched by pressing down a pedal, as will be necessary for working with the picking-machine.

The picking-device I, proper, is provided with a flexible shaft K, driven by a motor L, and air suction pipe M, through which the picked feathers pass, as soon, as they are released by the gripper. The fan N is preferably coupled with the motor L for driving the flexible shaft K.

The picking-device proper consists of a comb-like base-plate G, over which the gripper H moves.

The base-plate G is provided with comb-like prongs, whereby the feathers of the fowl are separated or combed and the skin of the fowl is kept back as the base-plate is moved forward.

During this forward movement of the base-plate G, a number of feathers are grasped by the gripper H between the prongs of the base-plate. The gripper H consists of two elements, a main supporting element $p$ and a movable element $q$ carried thereby. If the gripper is opened, the open spaces between prongs or points E, F (Fig. 2) lie above the openings of the comb of the base-plate G so, that the feathers slip from the prongs of the base-plate into the spaces between the prongs E, and F.

Figure 2:
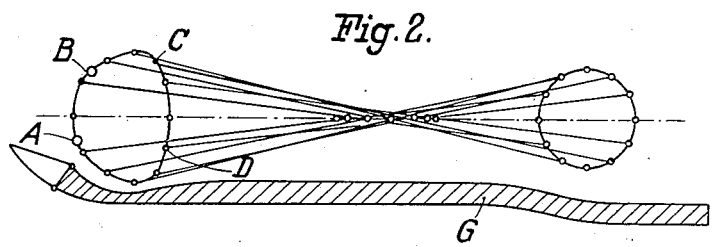
Figure 2 shows the base-plate in section and the picking-movement diagrammatically.

While the parts $p$ and $q$ of the gripper are in closed position they move through a curved path A—B, Fig. 2, and during this movement the feathers gripped in the gripper are plucked from the fowl, the skin being retained at the underside of the comb of the base plate.

The picking-elements therefore have a double movement, that is to say, a relative movement, to grip and release feathers and then a curved movement, vertical to the base-plate within the closed curve A—B—C—D. It is of particular advantage, that the lifting-motion from A to B is effected at a very high speed. Opening the grippers $p$ and $q$ is effected at an upper point of the curve, at the point B, previous to reaching the highest point of the curve, so that a kind of throwing action facilitates the removal of the feathers. A double drive is provided for moving the gripper and its elements.

The main part $p$ of the gripper H is mounted to swing around the shaft $r$. The front part of this gripper-element carries the claws which grip the feathers, while the other end of the gripper H is connected with a crank pin $f$ fastened to a crank-disc, revolving around the axle $h$. This crank-disc is driven by the flexible shaft K, by means of a bevel-gear. During rotation of the crank-disc, the point $f$ moves in a circle around the center of the shaft $h$ and the shaft $r$ moves back and forth in guides $s$. This combination of sliding- and crank-motion results in movement of the members $p$ and $q$ through the curve A—B—C—D. The shape of the curve depends partly upon the eccentricity $h$—$f$, and partly on the distance between axles $r$—$h$ and can be varied correspondingly within great limits.

It is likewise possible to displace the shaft $r$ on the lower part of the gripper for the purpose of varying the curve A—B—C—D. The movable part *q* of the gripper carries a pivot *i*, engaged by the fork of a lever *k*.

Control of this lever *k* is effected by a cam-rod *g*, pressed by the spring *o* against the cam-disc *c*. This cam-disc *c* is mounted upon the crank pin *f* of the above mentioned crank-disc. The shape of the cam disc *c* determines the point of the curve A—B—C—D, at which the gripper is opened and closed. By changing the shape of the cam disc, the opening- and closing-periods of the gripper may be varied at will. The spring *o* serves to resiliently move the lever *k* in a direction to effect closing movement of the member *q* and thus, in case the spaces between the members *p* and *q* are jammed with an accumulation of feathers, possibility of breakage of the parts is obviated.

I claim:

1. In a machine for picking poultry, a comb-like base, a two-part gripper device movably mounted for oscillation on the base plate and having feather gripping portions, and means rotatable about an axis remote from the axis of movement of the gripper device to impart a substantially circular movement to the gripping portions of said device, and means to alternately effect gripping and releasing movement of the parts of the gripping device during movement of the latter.

2. In a machine for picking poultry, a comb-like base plate, a two-part gripper device movably mounted for oscillation on the base plate and having feather gripping portions, and means rotatable about an axis remote from the axis of movement of the gripper device to impart a substantially circular movement to the gripping portions of said device, the parts of the gripping device being mounted for relative movement to alternately grip and release feathers, and means for effecting gripping and releasing movements of said parts.

3. In a machine for picking poultry, a comb-like base plate, a two-part gripper device movably mounted for oscillation on the base plate, the parts of the gripper device being mounted for relative movement to grip and release feathers, and common drive means for said gripper device and for the parts thereof rotatable about an axis remote from the axis of movement of the gripper device whereby during movement of the gripper device relative to the base plate, the parts of said device are caused to grip and release the feathers.

4. In a machine for picking poultry, a comb-like base plate, a two-part gripper device mounted for sliding and oscillatory movement on the base plate and having feather gripping portions, and a rotating member rotatable about an axis remote from the axis of oscillatory movement of said gripper device connected with said device to impart a substantially circular movement to the gripping portions thereof independently of the gripping movement of said portions.

In testimony whereof I have affixed my signature.

HERMANN GRATHWOHL.